(No Model.)
A. L. PARCELLE.
AUTOMATIC TELEGRAPH.
No. 262,106. Patented Aug. 1, 1882.
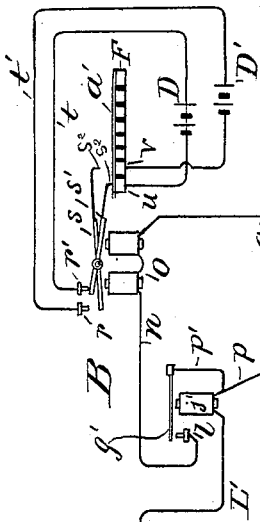
Fig. 1.
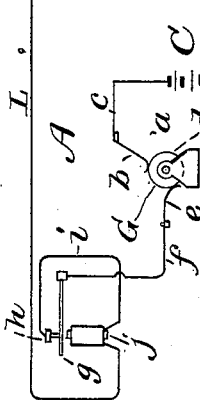
Fig. 3.
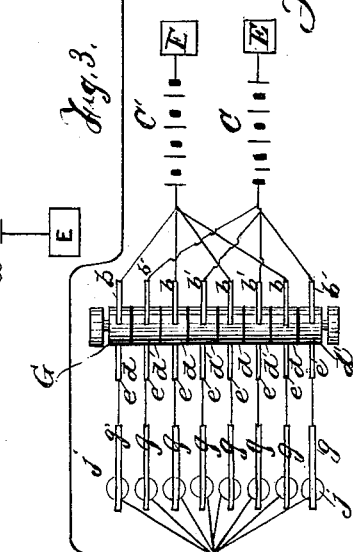
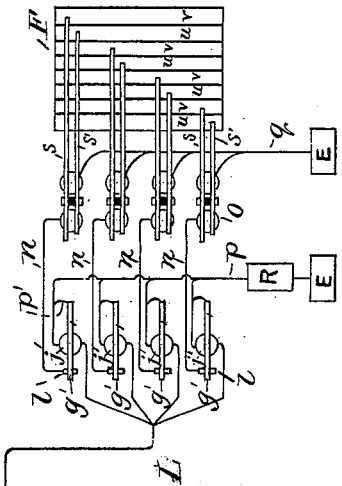
Fig. 2.
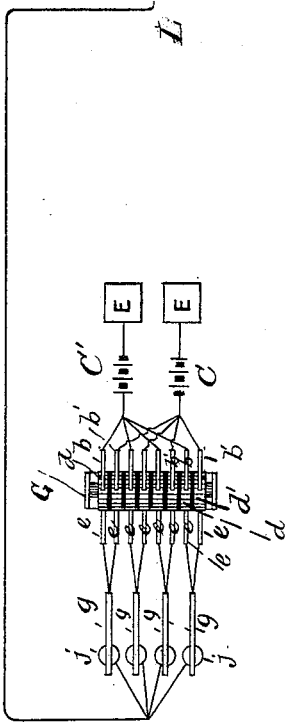
Witnesses.
F. H. Knight
Wm. H. Bates.
Inventor.
A. L. Parcelle
by Wight & Brown
Attys.

UNITED STATES PATENT OFFICE.

ALBERT L. PARCELLE, OF BOSTON, MASSACHUSETTS.

AUTOMATIC TELEGRAPH.

SPECIFICATION forming part of Letters Patent No. 262,106, dated August 1, 1882.

Application filed December 20, 1881. (No model.)

*To all whom it may concern:*

Be it known that I, ALBERT L. PARCELLE, of Boston, in the county of Suffolk and State of Massachusetts, have invented certain Improvements in Automatic Chemical Telegraphs, of which the following is a specification.

This invention relates to automatic chemical telegraphs, and is an improvement on the invention described in my pending application for Letters Patent for automatic telegraph filed September 27, 1881, No. 42,671.

The present invention involves the employment of the perforated message-strip, transmitting and receiving reeds, and chemical receiving-paper described in said application, the special improvement consisting in the transmission of alternating currents of electricity, whereby the line can be cleared of static charges and the number of reeds at both ends of the line can be lessened, if desired, so as to simplify and facilitate the mechanism required for the transmission and reception of messages, as I will now proceed to describe.

Of the accompanying drawings, forming a part of this specification, Figure 1 represents a side-view diagram illustrating my invention. Fig. 2 represents a plan view of the same, the back contacts and local circuits not being shown. Fig. 3 represents a different arrangement of reeds.

At the transmitting end A of the line is a roller, G, composed of a series of metallic disks, $d\ d'$, alternating with each other, and insulating-disks interposed between the metallic disks, as shown in Fig. 2. Upon the disks $d$ bear a series of metal brushes or springs, $b$, which are connected with a battery, C, and upon the disks $d'$ bear a series of similar brushes or springs, $b'$, which are connected with a battery, C'. Said batteries C C' have their poles reversely arranged—that is to say, the brushes $b$ are connected to one pole (say the positive) of the battery C, and the brushes $b'$ are connected to the opposite pole of the battery C'.

Upon the disks $d\ d'$ bear springs $e\ e$, which are connected in pairs with a series of musical reeds, $g$, as shown in Fig. 2, each reed being connected with one of the disks $d$ and one of the disks $d'$, and each tuned to separate pitch. Each reed $g$ is arranged over the pole of an electro-magnet, $j$, but is normally separated therefrom, and bears against a back contact, $h$, which is connected with its magnet $j$, as shown. The electro-magnets $j$ are all connected to line L. At the receiving end, B, of the line are a series of electro-magnets, $j'$. The line passes through said electro-magnets and normally through a resistance, R, to ground.

Over the poles of the magnets $j'$, and normally-separated therefrom, are a series of musical reeds, $g'$, corresponding in number to the reeds $g$, and each tuned to vibrate synchronously with one of said reeds $g$, as described in my above-named application. Each reed $g'$ is connected to its magnet $j'$, as shown. Under the free end of each reed $g'$, but not touching it normally, is a contact or anvil, $l$, which is connected through an electro-magnet, $o$, to ground, there being the same number of magnets $o$ as of magnets $j'$. Over each electro-magnet $o$ are two centrally-pivoted polarized armatures, $s\ s'$, each carrying at its outer end a stylus, $s^2$, which is adapted to touch a strip of chemical paper on a table, F, when the outer end of the armature to which it is attached is drawn downwardly by the action of the magnet $o$. The poles of the armatures $s\ s'$ are reversed, so that when the outer end of the armature $s'$, with its stylus $s^2$, is depressed the corresponding end of the armature $s$ is elevated, as shown in Fig. 1, and vice versa.

The table F is composed of a number of parallel metal strips, $u\ v$, alternating with each other and insulated by interposed insulating-strips.

Over the inner ends of each armature $s$ is a back contact, $r$, and over the corresponding ends of each armature $s'$ is a back contact, $r'$. Said back contacts are arranged to make contact respectively with the armatures $s\ s'$ whenever the outer ends of said armatures are depressed. The back contacts $r$ are connected through a local battery, D', with the strips $v$ of the table F, while the back contacts $r'$ are similarly connected to the strips $u$, each back contact being connected to only one of said strips.

The armatures $s\ s'$ are of different lengths, and the styluses of the armatures $s$ are arranged to coincide with the strips $v$ and the styluses of the armatures $s'$ with the strips $u$, as shown in Fig. 2.

In operating this apparatus I employ at the transmitting end a perforated message-strip like that shown in my above-named application, to which reference is made for a fuller description, said strip having several rows of perforations extending longitudinally of the strip, each of the perforations of each row having a different meaning from those in the other rows, and being made so that no perforation of any row will occupy the same space transversely of the strip that is occupied by a perforation of any other row. The rows of perforations are so arranged that one row will coincide with each of the disks $d$ $d'$ and brushes $b$ $b'$. When such a message-strip is drawn between the roller G and the brushes $b$ $b'$, the circuit is alternately closed and broken, as usual in automatic telegraphy.

It will be observed that each reed $g$ is connected to one of the disks $d$ and one of the disks $d'$. Hence each battery of the batteries C C$'$ can send a current through the same reed, said currents being of opposite polarity. The reeds $g$ are caused to vibrate when the circuit is closed, and the vibrations of each reed are transmitted through the line and received by the corresponding reed at the receiving end, as follows: An impulse of either polarity reaching an electro-magnet, $j'$, tends to go to ground through resistance R; but the core of said magnet, becoming charged, attracts its reed $g'$ to the contact $l$, thus connecting magnet $j'$ with magnet $o$. The resistance being made less through electro-magnet $o$ than through R, the current is shunted through said magnet $o$ and goes to ground by wire $q$. The electro-magnet $o$, being charged, attracts one of the poles of the polarized armatures $s$ $s'$, which are opposite in polarity to the passing current, thereby drawing down the style of one of the armatures—say the armature $s$—so that it touches the chemical paper passing under it on the surface of the table F, thus completing a circuit through one of the strips $v$ and its local battery and registering a definite character on said paper. At the same time the polarized armature $s'$ of the same magnet is attracted at its opposite end, and its style is raised from the paper. When an opposite current is sent from the sending-station the above described operation of the armatures $s$ $s'$ is reversed, the stylus that was before depressed being raised, and vice versa.

It will be seen that the arrangement whereby either positive or negative currents can be sent through the reeds at the sending and receiving stations and the provision of means at the receiving-station for enabling a a positive current to operate one stylus and a negative current another stylus enable the number of reeds employed to be reduced by one-half, each reed doing the work which two were required to perform in my above-named application. By the employment of alternating currents the line is constantly cleared of static charges, an opposite current clearing the line of a current previously sent. I do not limit myself, however, to employing a smaller number of reeds than of springs or brushes $b$ $b'$ and disks $d$ $d'$, for, if desired, there may be a reed for each disk and brush both at the transmitting and receiving end, as shown in Fig. 3, each alternate reed being connected through the springs and disks with the battery C and the others with the battery C$'$. The reeds are therefore arranged in pairs and the reeds of each pair are tuned to the same pitch. This arrangement enables the line to be cleared of static charges as before; and while it involves the employment of the same number of reeds as in my former application, it obviates the necessity of giving each reed a separate pitch from the others, so that the apparatus can be more practically operated, the maximum number of vibrations in the reeds being much less than in my former application. When the reeds are arranged as last described (and shown in Fig. 3) the polarized armatures $s$ $s'$ and electro-magnets $o$ at the receiving-station will not be employed, and the receiving-reeds $g'$ will be provided with points or styluses $s^2$, resting on the table F, and although the current will pass through the styluses of each pair of reeds $g'$ when a current is sent through one of the reeds $g$ of the corresponding pair at the transmitting-station, it is possible to employ such a chemical solution for the receiving-paper that a current of one polarity sent through a pair of reeds $g'$, and then styluses, will cause one stylus to effect a mark only upon the under surface of the paper and the other stylus to effect a mark upon the upper surface of the paper.

A current of opposite polarity sent through the same pair of styluses will cause the stylus which before marked on the under surface of the paper to mark upon the upper surface, and the other to mark on the under surface. The message will therefore be properly recorded.

The key-board arrangement described in my former application may be used instead of the paper strip for sending short messages.

I claim—

In an automatic telegraph, a series of musical transmitting-reeds, a series of receiving-reeds, and means for sending currents of one polarity through every alternate reed of each series and currents of an opposite polarity through the other reeds, as and for the purpose specified.

In testimony whereof I have signed my name to this specification, in the presence of two subscribing witnesses, this 13th day of December, A. D. 1881.

ALBERT L. PARCELLE.

Witnesses:
C. F. BROWN,
A. L. WHITE,